Oct. 9, 1951 F. C. TODD 2,570,288
PHOTOELECTRIC INSPECTION OF SHEET MATERIALS
Filed May 3, 1949 4 Sheets-Sheet 1

INVENTOR
FRANCIS C. TODD
BY
ATTORNEYS

Patented Oct. 9, 1951

2,570,288

UNITED STATES PATENT OFFICE 2,570,288

PHOTOELECTRIC INSPECTION OF SHEET MATERIALS

Francis C. Todd, Columbus, Ohio, assignor, by mesne assignments, to Howard Paper Mills, Inc., Dayton, Ohio, a corporation of Ohio Application May 3, 1949, Serial No. 91,151

12 Claims. (Cl. 250—219)

This invention relates to photoelectric surface inspecting apparatus and to a method for automatically examining a continuously moving sheet or a series of sheets of material to detect defects therein. The invention is useful for example in detecting and rejecting portions or sheets of paper containing dark inclusions, starch spots, folds, tears, holes and similar defects.

An inspection process to eliminate such defects is an essential step in the manufacture of high quality papers. Moreover the entire production must be inspected, sample inspection being insufficient. Despite many prior proposals of automatic systems, such inspection has in the past been carried out in practice by visual means, requiring an operator to examine the paper, to recognize defects therein, and to operate mechanism for rejecting the defective portions or sheets.

In accordance with the present invention inspection is carried out by a photoelectric cell or cells supported at a scanning station past which the material to be inspected is moved. Each cell is associated with a scanning unit which permits the cell to inspect a portion of the width of the material passing the scanning station. The photoelectric cell of each such unit is guided in its inspection of the material by optical scanning means which present to the cell for inspection successive elementary areas of material. The elementary area is defined by the scanning means, and the cell is shielded from illumination from all other sources. The scanning means moves the elementary area to which the cell is exposed over the material to be inspected in systematic fashion so that the entire area of the material passing the scanning station (or of the portion thereof allocated to one scanning unit) is explored by the photocell.

Variations in the light diffusely reflected to the cell by elementary areas containing defects, by comparison with that reflected from areas without defects, generate variations in the electrical output signals of the cell. These variations are conducted to suitable amplifying equipment. The amplifying equipment raises the amplitude of those components of the photocell output signal variations which are characteristic of defects in the material, while discriminating against spurious signals due to the operation of the scanning means, to flutter of the material at the scanning station, and to thermionic noise signals generated in the photocell. The amplified and filtered signals are then fed to properly located control equipment which diverts the defective material from the main stream passing the station.

The scanning means of the present invention which present successive areas of the material to the photocell comprise a plurality of lenses mounted for rotation about the photocell so as to focus an image of the material on the cell, a diaphragm and slit in front of the cell to limit the area on the material whose image may illuminate the cell by passing through the slit, and a light-tight shield which restricts illumination of the slit to light passing through one lens at a time during its passage over a restricted arc. The shield also protects the cell from illumination from all other sources.

The restriction of the light which reaches the photocell at any one instant to that reflected from an elementary area insures that the variation in photocell output signal due to the entry of a defect into the elementary area observed will be a substantial one, readily distinguishable from thermionic tube noise. The light-tight shield defines the limits across which the elementary area is swept transversely of the material at the scanning station, and excludes from the photocell all stray light.

As applied to the inspection of paper, the present invention makes possible without human intervention the automatic detection of defects of a wide variety and the rejection of portions of the paper which are so defective.

The detailed description to be given below concerns the application of the invention to the inspection of paper. However, it may be applied to the inspection of other materials in sheet or web form which have when unblemished a surface of substantially uniform optical reflection characteristics.

Figure 1:
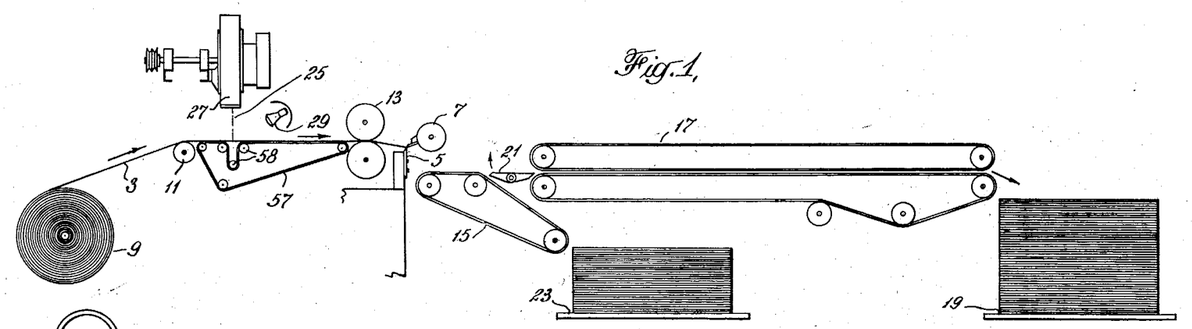
Fig. 1 is a diagrammatic representation of a paper cutting machine to which the invention has been applied. The machine of Fig. 1 is capable of cutting a roll of paper into sheets and of sorting the sheets as cut into stacks of perfect and defective sheets.

In Fig. 1 there is shown diagrammatically a paper cutting machine which includes a stationary knife 5 and a revolving knife 7. A continuous web of paper 3 is drawn from a roll 9 over an idler roller 11 and through a pair of draw rolls 13 to pass between the revolving and stationary knives. The sheets of paper produced by the action of the knives are conveyed by a set of carrier tapes 15 either to a further set of carrier tapes 17 for delivery to a layboy 19 for good paper or are diverted by a deflector 21 if imperfect to a layboy 23 for rejected sheets.

Figure 3:
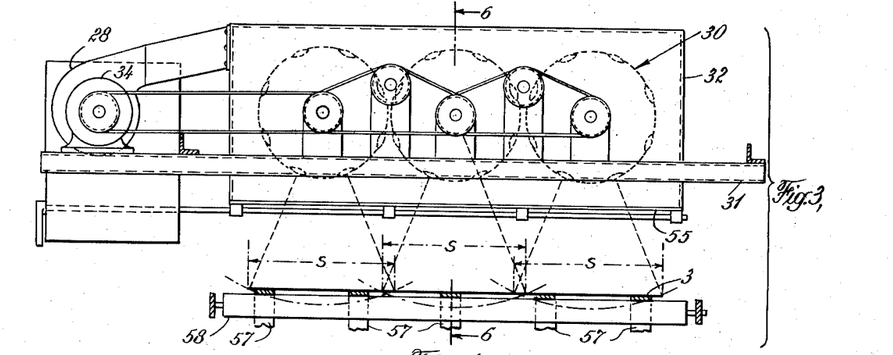
Fig. 3 is a view in elevation of a multiple scanning assembly according to the present invention, applicable either to the paper cutting machine of Fig. 1 or to the paper sorting machine of Fig. 2.

The inspection of the paper is carried out before it is cut at an inspection station 25 between the idler roller 11 and the draw rolls 13. A scanning assembly 27 as shown in Fig. 3 is supported above the web of paper to scan the full width thereof as it passes the inspection station.

The paper is supported on either side of the scanning station by a plurality of carrying tapes 57 disposed across the width of the web of paper and moving parallel to the direction of motion of the paper. At the scanning station itself the paper is preferably unbacked in order that the light reflected from the paper may be unaffected by any supporting elements in contact with it. For this purpose additional tape carrying rollers 58 are provided to divert the carrying tapes from contact with the paper at the scanning station.

A series of lamps 29 supported above the paper transversely thereof provide the paper with a high and preferably uniform level of illumination at the inspection station where it passes under the scanning assembly. As will be more fully described in connection with Fig. 3, the scanning assembly contains one or more photoelectric scanning units for the detection of defects, each unit being arranged to scan a part of the width of the web of paper. Each scanning unit comprises a photoelectric cell and associated mechanism which serves to expose the cell to a small spot or area on the paper, the spot being moved over the paper in a regular fashion so that the entire surface of the paper allocated to the scanning unit in question is explored by it. Differences between the light reflected to the cell from elementary areas containing defects and from perfect areas produce variations in the electrical output of the cell. These variations are amplified and used to operate means for rotating the deflector 21 so as to divert the portion of the paper having the detected defect to the reject layboy 23. Properly proportioned delay elements are provided in the signal channels between the scanning units in the assembly 27 and the mechanism which actuates the deflector 21 to insure that the sheet in which the detected defect falls is the one rejected.

Figure 2:
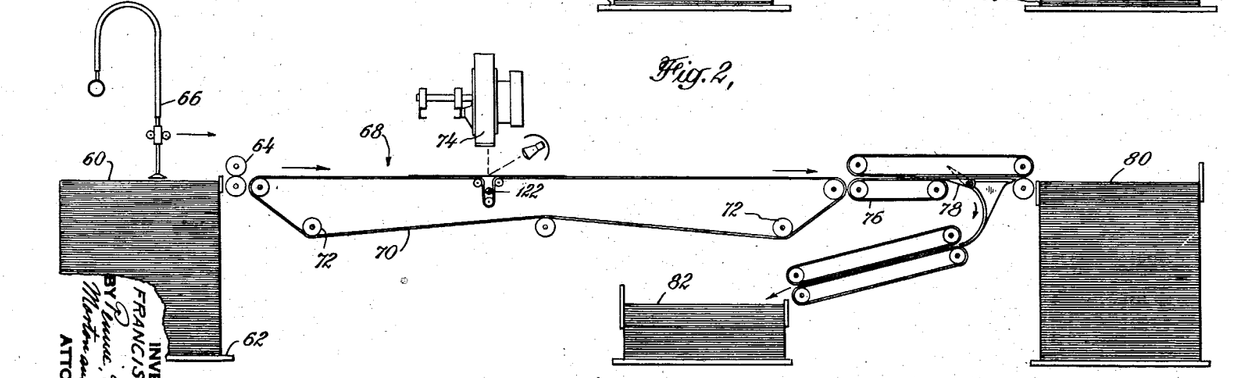
Fig. 2 is a diagrammatic representation of a paper sorting machine operating on ready cut sheets and incorporating the present invention. From a stack of uninspected sheets the machine of Fig. 2 separates the defective sheets and diverts them into a separate pile.

Fig. 2 illustrates the application of the invention to a paper sorting machine operating on ready cut sheets. A stack of uninspected sheets 60 is supported at one end of the machine on a table 62. The table 62 is associated with mechanism not shown adapted to keep the top of the stack at a constant level adjacent a pair of feeding rolls 64. A vacuum feeding mechanism generally indicated at 66 feeds the uninspected sheets one at a time into the feeding rolls which pass them onto the sorting table generally indicated at 68. A set of parallel carrying tapes 70 similar to the tapes 57 of Fig. 1 are spaced across the width of the sheets to be inspected and are driven by a set of rollers 72. The tapes 70 carry the sheets from the feeding rolls 64 under the scanning assembly 74 and on to a further set of carrying tapes 76 at the output end of the machine. A deflector 78 having a number of separate fingers spaced across the width of the machine is provided just beyond the tapes 76. In the absence of defects detected in a sheet passing under the scanning assembly, the deflector remains horizontal, in the position shown in full lines in the figure, and the inspected sheet passes on over the deflector to a stack of good paper 80. If the sheet contains a defect or defects, the signals produced in the scanning assembly thereby are used to raise the deflector to the dotted position indicated in the figure. The defective sheet is thereby diverted and passes to a stack of defective paper 82. Delay elements properly proportioned to the size of the sheets undergoing inspection and to the distance from the scanning assembly to the deflector insure that the deflector is actuated at the proper instant to reject the defective sheet.

The width of the paper to be examined, whether in rolls or sheets, is typically greater than the maximum width which can be conveniently scanned by a single photoelectric scanning unit. Accordingly, a number of scanning units are mounted in a single housing transversely of the width of the paper as indicated in Fig. 3.

In the scanning assembly of Fig. 3 three scanning units 30 are shown mounted together above a width of paper 3. Each scans a fraction S of the width of the paper, the fractions overlapping slightly to insure complete coverage. The paper is seen in section, and is moving perpendicularly to the plane of the figure. A roller 58, supported at either end beyond the sides of the paper, supports a plurality of tapes 57 which carry the paper to and away from the scanning station.

The assembly includes a pair of supporting members 31, of which only one is seen in the figure, supported on either side of the paper by conventional means forming part of the paper cutting or sorting machine. A housing 32, which may be common to the three scanning units, is supported by the members 31, and provides the scanning units with a light-tight enclosure except for an appropriately shaped aperture between each scanning unit and the paper. The units are driven through belting at pulleys 33 by means of a motor 34. The motor also drives a coupled fan 28 to provide supra-atmospheric pressure within the housing in order to minimize the accumulation of dust therein.

Figure 4:
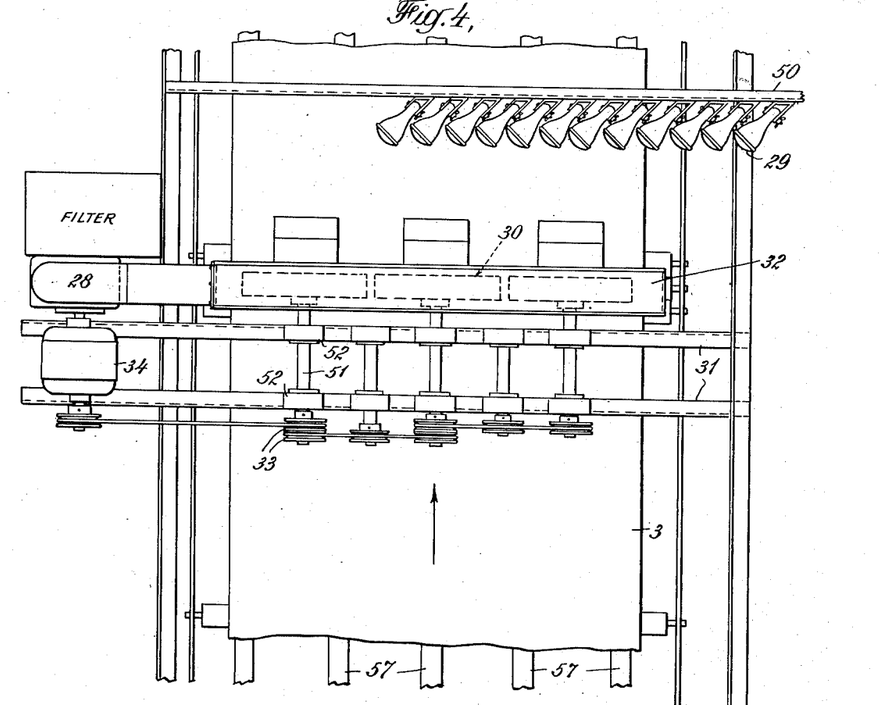
Fig. 4 is a plan view of the scanning assembly of Fig. 3 showing in addition the means employed to illuminate the paper being scanned.

The scanning assembly of Fig. 3 is seen in plan in Fig. 4, along with the means for illuminating the paper to be scanned. A high and uniform level of illumination is desirable. This is provided by a plurality of lamps 29 supported above the paper by a member 50 similar to the members 31. Since in the production of paper, folds and creases most often occur lengthwise of the web of paper manufactured, and since for their detection the direction of illumination should make a large angle with the length of the folds, the lamps are preferably supported so as to throw their beams onto the paper in parallel directions which are oblique to the direction of motion of the paper. An angle of 45° between the orientation of the beams (as projected on the horiznotal plane) and the direction of motion of the paper has proved satisfactory.

The separate scanning units which scan the paper or a portion of the width thereof will now be described.

Defects in the paper are detected according to the present invention by the variation in the amount of light which they diffusely reflect to properly positioned photocells by comparison with the light reflected from equivalent areas of unblemished paper. The defects may reflect either more or less light than an equal area of unblemished paper. In either event the defect is detected and the portion of the paper containing the defect is rejected.

Each scanning unit includes a photocell 35 (Fig. 5) fixedly supported above the paper 3 in position to be illuminated by the light diffusely reflected therefrom. In order to provide effective discrimination between the light reflected from an area containing a defect (which may be very small) and from an equal area without defect, means are provided to restrict the light which reaches the photocell at any one instant to that which is reflected from an elementary area on the moving web or sheet of paper. The elementary area whose reflected light is permitted to reach the photocell is moved over the surface of the paper by rotating scanning means so that the entire area of the paper (or of a width S thereof allocated to one scanning unit) is viewed by the photocell.

Figure 5:
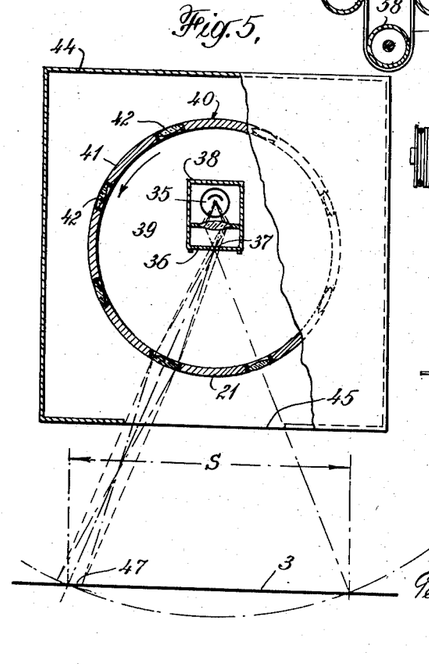
Fig. 5 is a diagrammatic representation in front elevation of a scanning unit of the type employed in the scanning assembly of Fig. 3.

To this end the photocell 35 is enclosed within a light-tight box 38 whose lower side 36 constitutes a diaphragm having a slit 37 therein of only properly chosen dimensions.

The size of the slit 37 is determined in part by the minimum size of deflects to be observed and in part by a requirement that the output current from the photocell must be held to low levels in order to prevent loss of sensitivity through fatigue and growth of the "dark current" which may be drawn from the cell even when unilluminated. Slit sizes of the order of 0.01 x 0.25 inches have been employed in conjunction with a lens system (next to be described) having a magnification of two. This gives a scanned spot or elementary area on the paper of double these dimensions which has proven satisfactory in detecting defects of the order of 1/32 inches in diameter.

In view of the construction of the box 38, the only light which can actuate the cell must pass through the slit 37. In order further to limit the source of the illumination which reaches the photocell at any instant to an elementary area scanned over the paper, the cell and its enclosing box 38 are surrounded by a drum 40 arranged to rotate about the slit 37 as a center and with its axis of rotation parallel to the plane of the paper and to the direction of its motion at the scanning station. The drum has an opaque cylindrical rim 41 in which a plurality of lenses 42 is mounted at equal intervals around the circumference of the drum. The drum is surrounded by a light-tight shield 44 which encloses it on all sides except over an opening 45. In the construction shown in Fig. 3 this shield 44 is provided by the housing 32. The opening 45 exposes an arc on the rim of the drum approximately equal to the angular separation of two adjacent lenses 42. The opening is further arranged so that the exposed arc is equally spaced about the point of closest approach of the drum to the plane of the paper. In consequence of the opaque construction of the drum and the surrounding light-tight shield, the photocell 35 is exposed at any one instant only to the light reflected from an elementary area 47 on the paper. The elementary area 47 is defined by the image on the paper of the slit 37 which is produced by the lens exposed at the opening 45.

The speed of rotation of the drum is adjusted with regard to the linear speed of the paper past the scanning station so that the successive sweeps of each scanning unit overlap slightly. Thus the advance made by the paper while the image of the slit is swept across the section S of the paper allocated to one scanning unit is slightly less than the length in the direction of paper motion of the image of the slit on the paper. Since the size of this image varies over the sweep with the variation in distance from the lens to the slit image, the adjustment is made with respect to the smallest slit image, which occurs when the lens is at its point of closest approach to the paper.

In one embodiment which has been constructed it was found convenient to employ a magnification of two between the size of the slit 37 and its image 47 on the paper. The radius of the drum and its position relative to the paper were so proportioned that the radius of the drum was approximately equal to one half the average distance from lens 42 opposite the opening 45 to the image of the slit 37 produced by the lens on the paper. As is apparent from Fig. 5 the distance from the lens to the scanned spot 47 varies over the width S of the scan so that the spot 47 can be in focus at the plane of the slit 37 for only two positions of the lens during a single scan or sweep i. e. passage of a lens 42 across the opening 45. This defocusing results in a scanning signal, a periodic variation in the illumination of the photocell and in its output which has a basic frequency equal to the scanning rate, i. e. to the rate of revolution of the drum 40 multiplied by the number of lenses 42 which are mounted therein. This scanning rate, at which most of the spurious energy in the photocell output due to the scanning signal appears, is below the frequencies at which the energy content of the pulse-shaped signals due to detected defects are distributed. Most of the scanning signal can therefore be eliminated from the amplified output signal by filtering without sacrificing the amplitude of the desired signals due to defects. It is nonetheless desirable to minimize the defocusing effect which causes the scanning signal. This is achieved by adjusting the height of the drum above the paper so that the focal plane at which the slit 37 is imaged by the lens 42 is as far above the paper at the ends of the sweep width S as it is below the plane of the paper in the middle of the sweep. As the number of lenses in the drum is increased, the scanning signal is further diminished in amplitude. Drums as shown in Fig. 5 employing eight lenses have proven satisfactory in this regard, giving also in conjunction with a magnification of two a sweep S sufficiently greater than the diameter of the drum so that the drums of a number of units may be mounted abreast, as shown in Figs. 3 and 4.

Because of the wide angle over which the image-forming bundle from the lens to the slit is moved during the scan, an additional lens or lenses are preferably provided within the box 38 to transfer the image at the slit to the plane of the photosensitive surface 18 in the photocell without shift of position of the slit image on the photosensitive surface. For this purpose a lens or lens assembly 39 is mounted inside the box 38 between the slit 37 and the photosensitive surface in the cell 35. The lens 39 may conveniently be figured to have a focal length approximately one quarter of the distance between the slit and the photosensitive surface and mounted half-way between the two. With this construction the variation in photocell output due to variation in the angle of incidence of the rays on the slit 37 is minimized.

Figure 6:
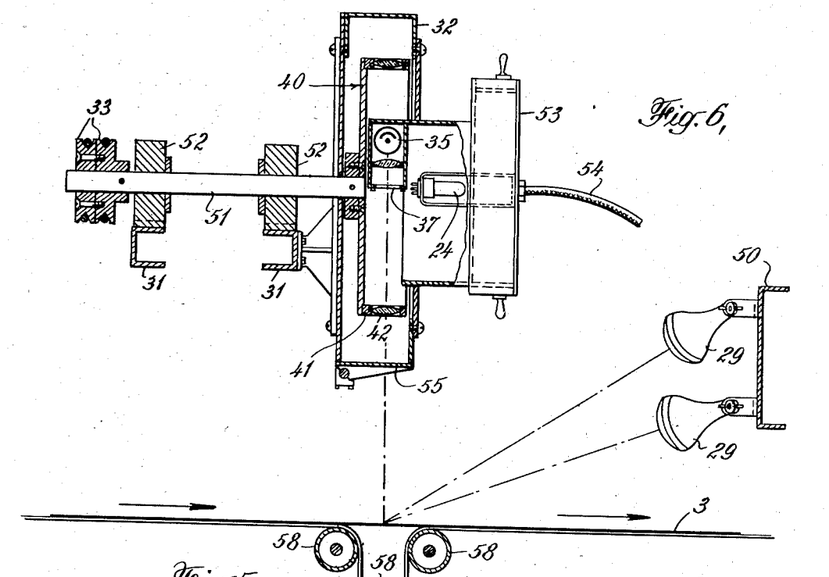
Fig. 6 is a vertical section through a scanning unit embodying the principles of the scanning unit shown in Fig. 5, taken along the line 6—6 of Fig. 3.

Fig. 6 illustrates the construction of one of the scanning units of Fig. 3 and further shows the arrangement for illuminating the paper to be scanned. The light sources 29 are preferably mounted above the paper so as to direct their rays into incidence upon the paper with an angle of incidence of some 75°. An angle of incidence of this order maximizes the capacity of the photocell to discriminate between variations in reflection due both to dark inclusions and starch spots on the one hand and to creases and folds on the other. The paper 3, seen in section in Fig. 6, has its direction of motion in the plane of the figure, and is carried past the inspection station on a plurality of carrier tapes 57 disposed across the width of the paper.

Within the housing 32 which is supported from the members 31, the drum 40 is mounted for rotation with a shaft 51 turning in bearings 52 and having pulleys 33 affixed thereto. The housing includes for each scanning unit a removable insert 53 which supports the photocell 35 with its slit 37 at the center of rotation of the drum. A vacuum tube 24 may be supported from the insert 53 to provide a first amplifier to the phototube currents. The power and signal connections to the phototube and amplifier are made through a cable 54. A door 55 is provided to close the openings 45 when the apparatus is not in use.

As the image of the slit 37 produced on the paper by moving lens 42 is swept across the paper, the photocell receives light from a succession of elementary areas. If defects are present in these areas, the light reflected to the photocell will differ, when the cell observes an area including a defect, from that reflected when the cell observes an elementary area containing no defects. This change in the illumination of the photocell will produce a change in the photoelectric current which can be amplified by suitable means to operate selective mechanism for rejecting the portion of the paper including the defect.

Figures 8, 9:
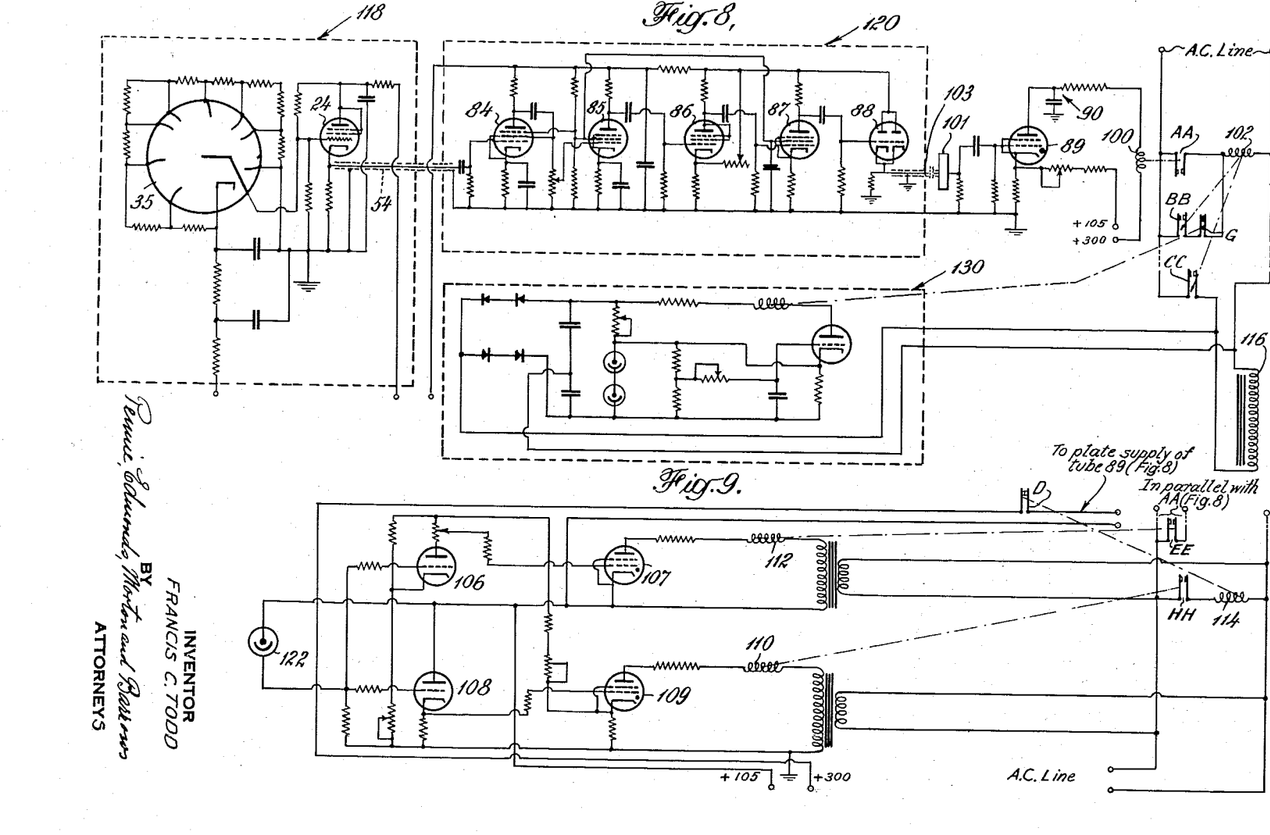
Fig. 8 is a schematic diagram of an electric circuit for use in conjunction with the scanning unit of Figs. 5 and 6.
Fig. 9 is a schematic diagram of the circuit elements required to add the functions of the sheet end control device of Fig. 7 to those of Fig. 8.

Fig. 8 is a schematic diagram showing an electrical circuit which, when associated with each one of the scanning units of Fig. 3, will operate a deflector of the type shown at 21 in Fig. 1 or at 78 in Fig. 2. A photoelectric cell 35 of the photomultiplier type and an associated cathode follower 24 shown in the dashed line box 118 are mounted together in the scanning unit as described in connection with Fig. 6. The cathode follower serves primarily as an impedance transformer so that the photocell signals may be passed through a cable 54 to the amplifier 120 which may be placed at any convenient location. Since the change in photocell output produced by the passage of the scanning system over a defect has the general form of a pulse, the amplifier is designed to pass a wide band of frequencies. It includes tubes 84, 85, 86 and 87 which provide an over-all gain of 1,000 or more. The amplifier is designed to pass frequencies in a band extending from approximately 8,000 to 60,000 cycles per second. Attenuation of signals below the lower limit of this band eliminates the variations in photocell current due to defocusing of the slit image during the scanning movement. It also suppresses the variations due to momentary exposure of the photocell to partial beams from two lenses at the beginning and end of each sweep. Attenuation of the higher frequencies discriminates against the noise signal generated in the photo tube independently of the illumination. This improves the signal to noise ratio at the output of the amplifier.

The amplifier is followed by a cathode follower 88. The output of the cathode follower 88 may be passed through a low impedance cable 103 to a gas triode 89 of the type commonly known as a thyratron, located at the reject mechanism which operates the deflector.

A suitable signal storage and delay element diagrammatically indicated at 101 may be inserted in the line 103 between the cathode follower 88 and thyratron 89 in order to provide actuation of the reject mechanism at the proper interval after the passage of the defect under the scanning unit.

In view of the rapidity with which the scanning system traverses a defect of the usual size, the photocell signal produced by the defect has the general form of a pulse either positive or negative according to the nature of the defect. A differentiating circuit in the grid circuit of tube 84 at the entrance to the amplifier produces in either event a positive signal which serves to fire the thyratron 89.

The thyratron plate circuit includes the coil of a relay 100. When the relay 100 is energized by the flow of current in the thyratron 89 it closes a pair of associated contacts AA, energizing the coil of an A. C. relay 102 across the A. C. line. When the relay 102 is energized, its associated contacts BB and CC are closed. The closing of the contacts BB maintains the relay 102 energized regardless of the opening of contacts AA after the pulse applied to the thyratron 89 has passed. The closing of the contacts CC energizes the reject solenoid 116 which actuates the deflector. A suitable electronic timer 130 may be placed in parallel with the reject solenoid which after a suitable interval, will open the normally closed contacts G. This de-energizes the relay 102 and opens the contacts CC, restoring the circuit to the ready condition. After the passage of the signal due to the defect, the thyratron 89 is promptly deionized by the resistance-capacitance network indicated at 90.

Figure 7:
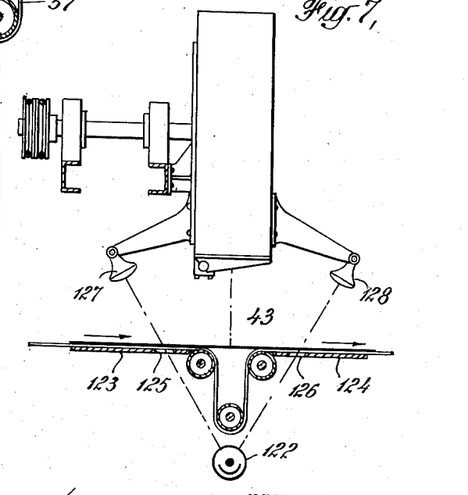
Fig. 7 is a diagrammatic view of a photoelectric sheet end control device incorporated with the scanning assembly of Fig. 3 in the paper sorting machine of Fig. 2 in order to prevent false operation of the mechanism for rejecting defective sheets due to the passage under the scanner of the interval between two successive sheets.

In the application of the invention to a paper sorting machine, means must be provided to prevent the actuation of the reject mechanism due to the passage under the scanning units of the interval between two successive sheets. For this purpose an auxiliary photocell 122 is mounted below the paper at the scanning station, as indicated in Fig. 2 and, in more detail in Fig. 7. Opaque members 123 and 124 are arranged immediately beneath the plane of the paper on either side of the area 43 scanned by the scanning units. The members 123 and 124 are provided respectively with apertures 125 and 126 through which when unobscured light may pass from auxiliary sources 127 and 128 to the end control photo tube 122. A sheet advancing from the left will therefore first obscure the aperture 125, pass over the scanning area 43 and then obscure aperture 126. By means of an associated circuit shown in Fig. 9, the output signal from the photocell 122 while exposed to the light passing through either or both of the apertures 125 and 126 operates to deenergize the thyratron 89 (Fig. 8) which controls the reject solenoid. In this way the deflector is prevented from operating until the advancing sheet of paper to be inspected has covered both of the apertures 125 and 126. Similarly as the sheet leaves the inspection station after its inspection has been completed the thyratron 89 is de-energized when the trailing edge of the sheet uncovers the aperture 125. In consequence a narrow strip at the leading and trailing edges of the sheet remains uninspected, the width thereof being measured by the distance between either of the apertures and the scanning area 43. These uninspected edges are trimmed from the sheets during a subsequent finishing operation. The apertures 125 and 126 are placed of course as close to the scanning area 43 as possible.

The circuit associated with the sheet and control photocell 122 is shown in Fig. 9. It includes two amplifiers 106 and 108 driven in parallel by the photocell output, a pair of thyratrons 107 and 109 and additional relays 110, 112 and 114. The output signals of the amplifiers 106 and 108 are connected to their respective thyratrons 107 and 109 in opposing phases. Thus an increase in photocell output, while driving positive the grids of both tubes 106 and 108, will reduce the voltage on the grid of the thyratron 107 while increasing the voltage on the grid of the thryratron 109, and vice versa. When a single sheet of paper obscures both of the apertures 125 and 126, a small amount of light from the auxiliary sources 127 and 128 gets through to the photocell because of the translucence of the paper. The photocell output under such circumstances is at an intermediate level which does not bring either of the thyratrons into conduction. However, if the photocell is exposed directly to either or both of the sources 127 and 128, the increase in photocell illumination increases the plate currents in the tubes 106 and 108 and brings the thyratron 109 into conduction. The relay 110 in its plate current is accordingly energized, closing a pair of contacts HH connected in series with the coil of a relay 114 across the A. C. line. The relay 114 when energized opens a pair of normally closed contacts D inserted in the plate supply line to the thyratron 89 (Fig. 8), thus preventing operation of the reject mechanism while the interval between two sheets is passing the scanning station. In the application of the invention to the sorting machine of Fig. 2 the deionizing circuit 90 of Fig. 8 may be omitted.

If the feeding mechanism 66 of the paper sorting machine of Fig. 2 passes two or more sheets to the scanning station at once, the double thickness of paper obscuring the apertures 125 and 126 so diminishes the illumination of the photocell 122 as to reduce the plate current in the tube 106 to a point such that the thyratron 107 is raised into conduction. When the thyratron 107 fires, a relay 112 connected in its plate current is energized, closing a pair of contacts EE in parallel with the contacts AA (Fig. 8). Closing of the contacts EE results in the operation of the reject solenoid in the same manner as the detection of a defect which results in the closing of the contacts AA. In this way the passage of an uninspected sheet to the stack of good paper is prevented.

In a photoelectric inspection machine embodying a plurality of scanning units as illustrated in Fig. 3, there are of course a photocell 35 and cathode follower 24 for each scanning unit. A single amplifier 120 with the following thyratron 89 and relay system may serve all scanning units however. To connect the output of the several cathode followers 24 of the separate scanning units to the first tube 84 of the amplifier it is advisable, in order to minimize the loss of signal, to insert a coupling tube at the end of each line 54, the coupling tubes all having a common plate load impedance from which the signal in any one or more of the scanning units is fed to the first tube 84 of the amplifier.

I claim:

1. In a machine for the photoelectric inspection of moving sheet material, a scanning head comprising a photoelectric cell mounted above the material in position to be illuminated by light reflected therefrom, a diaphragm in front of the cell having a slit therein through which light reflected from the material may pass to the cell, a drum mounted for rotation about the slit, a plurality of lenses mounted in the periphery of the drum with their optical axes intersecting the slit, and a light-tight hood surrounding the drum, the hood having an opening therein exposing the lenses to light reflected from the material over an arc of their travel including the point of closest approach of the lenses to the material.

2. In a device for photoelectrically inspecting sheet material, a scanning head adapted to survey successive elementary areas of the material as the material is moved past an inspection station at which the scanning head is located, the said scanning head comprising a photoelectric cell supported above the material at the inspection station in position to be illuminated by light reflected from the sheet material passing the inspection station, a diaphragm disposed between the cell and sheet material and adjacent the cell, a slit in the diaphragm through which light must pass to reach the cell, a drum supported for rotation about the slit with its axis of rotation substantially parallel to the direction of motion of the sheet material at the inspection station, a plurality of lenses mounted at equal angular intervals around the periphery of the drum with their optical axes intersecting the slit, and a light-tight housing surrounding the drum and having an aperture therein adapted to permit the passage of light through the said lenses successively and into the slit over a restricted arc in the path of the lenses including the point of the said path closest to the sheet material, whereby the cell is illuminated during the rotation of the drum by a continuously changing element of the area of the material, the said element being defined by the image on the material of the slit produced by the lens in the said arc.

3. In a photoelectric paper inspecting machine, a photoelectric cell supported in position to receive light reflected from the paper, a drum having an opaque cylindrical rim supported for rotation about the cell, a plurality of lenses mounted in the rim of the drum with their optical axes intersecting the cell, and a light-tight shield surrounding the drum laterally and peripherally except over an arc including the point on the drum closest to the paper, the said drum and hood restricting the illumination of the cell to light passing through the one of the said lenses which is located opposite the said arc.

4. In a photoelectric paper inspection machine, a photoelectric cell supported above the paper in position to receive light reflected therefrom, a slit between the cell and paper, a drum supported for rotation above the paper about an axis parallel to the plane of the paper at the inspection station and intersecting the slit, an opaque cylindrical rim on the drum, a plurality of lenses mounted at equal angular intervals in apertures in the drum with their optical axes intersecting the axis of rotation of the drum, a light-tight shield surrounding the drum except for an aperture exposing a portion of the rim of the drum substantially equal to the interval between two adjacent lenses, and means to rotate the drum at a rotational speed adjusted with reference to the linear speed of the paper so that one lens travels across the aperture in the sheld in a time not longer than that required for the paper to advance a distance equal to the length along the direction of paper motion of the image of the slit formed on the paper by the lens opposite the aperture when at its point of closest approach to the paper.

5. In a photoelectric paper inspecting machine, a photoelectric cell supported in position to receive light reflected from the paper, a drum having an opaque cylindrical rim supported for rotation about the photocell, a plurality of lenses mounted at equal angular intervals in the rim of the drum with their optical axes intersecting the photocell, and a light-tight shield surrounding the drum laterally and peripherally except over an arc of the drum substantially equal to the angular interval between two adjacent lenses, the said arc including the point on the drum closest to the paper, the said drum and shield restricting the illumination of the cell to light passing through the one of the said lenses which is located opposite the said arc.

6. The method of photoelectrically inspecting sheet material for defects which comprises advancing the material at a substantially constant speed past an inspection station, illuminating the material at the inspection station simultaneously across the breadth thereof, supporting a photoelectric cell above the material, interposing between the cell and the material an image-forming means defining on the material an elementary area conjugate in the image-forming means to the sensitive area of the cell, moving the image-forming means in coordinated relation with the motion of the material past the inspection station so that the elementary area sweeps out the entire surface of the material to be inspected by the cell, and excluding from the cell all light except that reflected from the elementary area.

7. The method of photoelectrically examining sheet material for defects which comprises continuously moving the sheet material through a substantially fixed plane at an inspection station, illuminating the material at the inspection station simultaneously across the breadth thereof, exposing a photosensitive element to the light reflected from a succession of small contiguous areas on the material, the photosensitive element being shielded from illumination from all other sources, deriving amplified signals from the output of the photosensitive element, selecting from the amplified signals those having frequency components peculiar to excitation of the photosensitive element by elemental areas containing defects, and utilizing the said selected signals to actuate mechanism for rejecting portions of the material containing defects.

8. The method of photoelectrically detecting defects in a continuous web of sheet material which comprises maintaining the material in a substantially flat condition while at a scanning station, illuminating the material at the scanning station simultaneously across the breadth thereof, cyclically exposing a photosensitive element above the material to a series of in-line contiguous elementary areas of the material making up a strip crosswise of the material at the scanning station, continuously moving the material past the inspection station at a rate such that the advance of the material past the scanning station during the cycle required to expose the photosensitive element to the said strip is not greater than the dimension of the said strip in the direction of motion of the material, amplifying the output signals of the photosensitive element, selecting from the said amplified output signals the components having frequencies above the cyclical rate at which the photosensitive element is exposed to the said strip, and utilizing the said selected components to actuate selective mechanism for rejecting portions of the said material containing defects.

9. The method of photoelectrically detecting defects in a continuous web of sheet material which comprises maintaining the material in a substantially flat condition while at a scanning station, illuminating the web of the material at the scanning station simultaneously across the breadth thereof, cyclically optically sweeping a photosensitive element across a strip of the material transverse to the length of the web at the scanning station, continuously moving the material past the inspection station at a rate such that the advance of the material past the scanning station during the sweep cycle is not greater than the dimension of the said strip in the direction of motion of the material, amplifying the output signals of the photosensitive element, selecting from the said amplified output signals those components having frequencies above the frequency of the sweep cycle, and utilizing the said selected components to actuate selective mechanism for rejecting portions of the said material containing defects.

10. The method of photoelectrically detecting defects in sheet material which comprises continuously moving the sheet material past a scanning station, maintaining the material in a substantially flat condition while at the scanning station, illuminating the material at the scanning station simultaneously across the breadth thereof, cyclically exposing a photosensitive element to the light reflected from successive contiguous elementary areas crosswise of the material at the scanning station, amplifying the output signals of the photosensitive element, selecting from the said amplified output signals the high frequency components induced by defects in the sheet material, and utilizing the said high frequency signals to actuate selective mechanism for rejecting the portions of the sheet material containing defects.

11. In a photoelectric sheet material inpection machine including means to advance sheets of material successively past an inspection station, scanning apparatus mounted adjacent the inspection station, and reject mechanism operatively connected to the scanning apparatus, the reject mechanism being adapted to be actuated by signals generated in the scanning apparatus by defects in the material passing the scanning station and to reject the sheets containing such defects, a sheet end control device adapted to prevent actuation of the reject mechanism during the interval between successive sheets and to effect actuation of the reject mechanism upon a simultaneous passage of two or more sheets at the scanning station, said device comprising two opaque plates located on each side of the scanning station in the path of the paper, an aperture in each of said plates, a photocell mounted beneath the plates in position to receive light passing through one or both of the apertures, two electronic amplifiers connected in parallel with the photocell output, one of the said amplifiers including substantially no phase shift and the other including substantially 180° phase shift, a grid glow tube connected to the output of each of the said amplifiers, and a relay connected in the plate circuit of each of the grid glow tubes, the amplifiers being so adjusted that the photocell output due to light passing through a single layer of paper over the apertures leaves both grid glow tubes outside the conducting region, the armature of the relay in the no phase shift channel being adapted when actuated to disable the reject mechanism and the armature of the relay in the 180° phase shift channel being adapted when actuated to actuate the reject mechanism, whereby the reject mechanism is disabled during the passage over the scanning station of the interval between two successive sheets and whereby the reject mechanism is actuated upon the simultaneous passage of two or more sheets over the scanning station.

12. The method of photoelectrically inspecting sheet material for defects which comprises advancing the material at a substantially constant speed past an inspection station, illuminating the material at the inspection station simultaneously across the breadth thereof, exposing a photoelectric cell supported above the material to an elementary area of the material defined by the image of the sensitive area of the cell formed on the material by an image-forming system, moving the image-forming system in coordinated relation with the motion of the material past the inspection station so that the elementary area sweeps out the entire surface of the material to be inspected by the cell, and excluding from the cell all light except that reflected from the said elementary area.

FRANCIS C. TODD.

REFERENCES CITED

The following references are of record in the file of this patent:

UNITED STATES PATENTS

| Number | Name | Date |
|---|---|---|
| 939,338 | Sellers | Nov. 9, 1909 |
| 1,966,243 | Hanna et al. | July 10, 1934 |
| 2,477,821 | Potts | Aug. 2, 1949 |